United States Patent
Nihei et al.

(10) Patent No.: US 7,445,260 B2
(45) Date of Patent: Nov. 4, 2008

(54) GRIPPING TYPE HAND

(75) Inventors: Ryo Nihei, Fujiyoshida (JP); Kazunori Ban, Yamanashi (JP); Takashi Sato, Yamanashi (JP); Toshinari Tamura, Gotenba (JP); Kokoro Hatanaka, Yamanashi (JP)

(73) Assignee: Fanuc Ltd, Minamitsuru-gun, Yamanashi (JP)

(*) Notice: Subject to any disclaimer, the term of this patent is extended or adjusted under 35 U.S.C. 154(b) by 0 days.

(21) Appl. No.: 11/245,012

(22) Filed: Oct. 7, 2005

(65) Prior Publication Data

US 2006/0145494 A1 Jul. 6, 2006

(30) Foreign Application Priority Data

Oct. 8, 2004 (JP) ............................ 2004-296618

(51) Int. Cl.
*B25J 13/08* (2006.01)
*B25J 15/08* (2006.01)

(52) U.S. Cl. .................... 294/106; 294/907; 901/34; 901/46

(58) Field of Classification Search ................ 294/106, 294/907; 901/31–36, 38, 39, 46; 623/64
See application file for complete search history.

(56) References Cited

U.S. PATENT DOCUMENTS

| 4,132,318 A | | 1/1979 | Wang et al. |
| 4,653,793 A | | 3/1987 | Guinot et al. |
| 4,921,293 A | | 5/1990 | Ruoff et al. |
| 4,957,320 A | | 9/1990 | Ulrich |
| 5,108,140 A | * | 4/1992 | Bartholet .................... 294/106 |
| 5,280,981 A | * | 1/1994 | Schulz ........................ 294/106 |
| 5,437,490 A | * | 8/1995 | Mimura et al. .............. 264/106 |
| 5,570,920 A | * | 11/1996 | Crisman et al. ............. 294/111 |
| 5,762,390 A | * | 6/1998 | Gosselin et al. ............. 294/106 |
| 6,244,644 B1 | * | 6/2001 | Lovchik et al. ............. 294/111 |
| 6,918,622 B2 | * | 7/2005 | Kim et al. .................... 294/106 |
| 2003/0090115 A1 | | 5/2003 | Kim et al. |

FOREIGN PATENT DOCUMENTS

| JP | 53-85050 | 7/1978 |
| JP | 4-69184 | 3/1992 |
| JP | 5-31856 | 12/1993 |
| JP | 1-100089 | 4/1998 |
| JP | 10-151595 | 6/1998 |
| JP | 11-245187 | 9/1999 |
| JP | 2003-127081 | 5/2003 |

* cited by examiner

*Primary Examiner*—Dean J Kramer
(74) *Attorney, Agent, or Firm*—Drinker Biddle & Reath LLP

(57) ABSTRACT

A gripping type hand including a plurality of finger mechanisms provided respectively with finger joints, actuators for driving the finger joints, and links supported by the finger joints and operating under driving force of the actuators. The gripping type hand includes an operation controlling section capable of respectively controlling the actuators of the plurality of finger mechanisms independently from each other; a position detecting section for respectively detecting operating positions of the finger joints of the plurality of finger mechanisms; and strain detecting sections provided respectively for the plurality of finger mechanisms and detecting strains generating in the links due to force applied to the finger mechanisms. The operation controlling section coordinately controls the actuators of the plurality of finger mechanisms to adjust gripping force generated by the plurality of finger mechanisms, based on the operating positions of the finger joints detected by the position detecting section and the strains of the links detected by the strain detecting sections.

10 Claims, 10 Drawing Sheets

GRIPPING TYPE HAND

BACKGROUND OF THE INVENTION

1. Field of the Invention

The present invention relates to a gripping type hand.

2. Description of the Related Art

In an operation of a robot to handle a workpiece or tool, it is a known configuration that a hand provided with a plurality of (generally about two or three) fingers is attached to the front end of an arm and the fingers are operated to open or close by a pneumatic pressure so as to grip the workpiece or tool. In this configuration, a so-called servo-hand which uses a servomotor as a drive source of the fingers and converts a rotary output of the servomotor to a linear motion through a ball-screw mechanism so as to open or close the fingers has been commercially developed. Further, while mostly in a research stage, a multi-finger hand which includes a plurality of (in general three or more) finger mechanisms provided respectively with joints, and which operates the finger mechanisms in various ways to grip an object, has been proposed as a hand mimicking a human hand.

For example, Japanese Unexamined Patent Publication (Kokai) No. 10-100089 (JP-A-10-100089) discloses a multi-finger hand having a plurality of multi-articulated fingers, each of which is provided with a force sensor. This multi-finger hand has a configuration such that, when gripping an object, the fingers are operated while monitoring external forces acting on the respective fingers by force sensors, the operations of the fingers are stopped at an instant when it is detected that the respective fingers contact the object, and a gripping force is generated in this state to grip the object. JP-A-10-100089 also describes that the gripping force of the hand is controlled so as to correspond to the external forces detected by the force sensors.

In the above conventional hand having a configuration operating the fingers by a pneumatic pressure, the gripping force depends on the cross-sectional area of a pneumatic cylinder and a working air pressure. The pneumatic cylinder usually operates so as to generate a constant air pressure, so that it is necessary to select the cylinder having optimal dimensions in accordance with the weight of an object to be gripped (i.e., a gripped object). Further, the opening/closing distance of the finger obtained by the cylinder is not so large, so that the size of the object capable of being gripped substantially depends on the combination of the cylinder and the finger. In other words, in order to grip objects having different sizes, it is necessary to suitably exchange the hand to another one including a cylinder and a finger corresponding to the size of the object. Therefore, in the case of a robot system using a single robot to handle a plurality of workpieces, the frequent exchange of hands is predicted, and thus an increase in cost in the system, an increase in a cycle time, an increase in a hand storage area, etc., may occur.

On the other hand, the above conventional servo-hand enables the fingers to have a large opening/closing distance, so that the range of dimensions of objects able to be gripped is increased. Further, by a torque control of the servomotor, it is possible to easily adjust the gripping force. However, for example, with a servo-hand having three fingers, the fingers are generally arranged at regular intervals (i.e., at every 120 degrees of center angles), so that it may be difficult for three fingers to grip the object when the gripping positions on the object are specified or due to the specified shape of the object. In this case, it is necessary to provide hands with different number or arrangements of fingers. Further, this type of conventional hand has no means for detecting that, for example, an external force causes an object to slip with respect to the fingers during a period when the hand grips the object. Therefore, for example, in a work for fitting the gripped object with another object by using a hand, a smooth fitting operation may become difficult.

Moreover, the conventional multi-finger hand, such as the above-described multi-finger hand of JP-A-10-100089, usually aims to improve the degree of freedom of the fingers, and, as a result, the structure thereof tends to become complicated and the operational control tends to become troublesome. Further, as described in JP-A-10-100089, in the system detecting a load acting on the hand by a force sensor to control a gripping force, a multi-axial force sensor unit, such as a six-axial force sensor able to detect a load by dividing the load into a total of six components of three-dimensional force and three-dimensional moment, a three-axial force sensor able to detect a load by dividing it into three-dimensional forces, and so on, is generally used. In general, the multi-axial force sensor unit detects three to six components of a load by a relatively small structure, so that it has a complicated, delicate mechanism, and that, for a stable and high-precision measurement, it is difficult to produce, calibrate and handle the unit. Therefore, it is required for a stable and high-precision control of the gripping force to pay the very careful attention to handle the multi-axial force sensor unit. If the multi-axial force sensor unit declines in performance or malfunctions, the expected control of the gripping force becomes difficult. Further, the multi-axial force sensor unit is generally expensive and may cause an increase in the cost of production of the hand. In this connection, it should be noted that the term "load" used in this application means the force and moment applied from the outside.

SUMMARY OF THE INVENTION

It is an object of the present invention to provide a gripping type hand including a plurality of fingers provided respectively with joints, which enables a gripping force to be controlled to correspond to a load applied to each finger, without using a multi-axial force sensor unit.

Another object of the present invention is to provide a gripping type hand including a plurality of fingers provided respectively with joints, which is simple in structure and can be easily controlled in operation.

To accomplish the above object, the present invention provides a gripping type hand, comprising a plurality of finger mechanisms provided respectively with finger joints, actuators for driving the finger joints, and links supported by the finger joints and operating under driving force of the actuators; an operation controlling section capable of respectively controlling the actuators of the plurality of finger mechanisms independently from each other; a position detecting section for respectively detecting operating positions of the finger joints of the plurality of finger mechanisms; and strain detecting sections provided respectively for the plurality of finger mechanisms and detecting strains generating in the links due to force applied to the finger mechanisms; the operation controlling section coordinately controlling the actuators of the plurality of finger mechanisms to adjust gripping force generated by the plurality of finger mechanisms, based on the operating positions of the finger joints detected by the position detecting section and the strains of the links detected by the strain detecting sections.

The above-described gripping type hand may further comprise a contact position calculating section for determining a contact position on each of the plurality of finger mechanisms at which each finger mechanism contacts a gripped object, based on the operating positions of the finger joints detected by the position detecting section and the strains of the links detected by the strain detecting sections.

The contact position calculating section may determine a time-base varying amount of the contact position on the each finger mechanism during a period when the hand grips the gripped object. In this arrangement, the operation controlling section may adjust the gripping force, based on the varying amount of the contact position. Alternatively, the operation controlling section may adjust a geometric configuration of the each finger mechanism, based on the varying amount of the contact position. Alternatively, the operation controlling section may adjust a relative positional relationship between the each finger mechanism and the gripped object, based on the varying amount of the contact position. Alternatively, the operation controlling section may adjust a position of a control point provided on the gripped object as an aimed point for an operation control of the plurality of finger mechanisms, based on the varying amount of the contact position.

The above-described gripping type hand may further comprise a load calculating section for determining a load applied on the hand from the gripped object, based on the operating positions of the finger joints detected by the position detecting section and the strains of the links detected by the strain detecting sections.

Each of the plurality of finger mechanisms may be provided with a plurality of finger joints and a plurality of links, at least one of the plurality of links comprises a parallel link mechanism. In this arrangement, each of the actuators may drive one finger joint supporting the parallel link mechanism, to cause an operation of the parallel link mechanism and simultaneously cause an operation of another link following the parallel link mechanism.

The above-described gripping type hand may further comprise a pedestal to which the plurality of finger mechanisms are attached, and a second actuator for shifting on the pedestal an attachment part of at least one finger mechanism attached to the pedestal.

In this arrangement, the operation controlling section may control the second actuator to adjust the gripping force generated by the plurality of finger mechanisms, based on the operating positions of the finger joints detected by the position detecting section and the strains of the links detected by the strain detecting sections.

Each of the strain detecting sections may comprise a strain gauge provided for each of the plurality of finger mechanisms. Alternatively, each of the strain detecting sections may comprise a plurality of single-axis strain gauges provided for each of the links of the finger mechanisms.

The present invention also provides a gripping type hand, comprising a plurality of finger mechanisms, each finger mechanism being provided with a plurality of finger joints, a plurality of links supported by the finger joints, at least one of the links including a parallel link mechanism, and an actuator for causing an operation of the parallel link mechanism and thereby causing an operation of another link following the parallel link mechanisms; an operation controlling section capable of respectively controlling actuators of the plurality of finger mechanisms independently from each other; a position detecting section for respectively detecting operating positions of the actuators of the plurality of finger mechanisms; and strain detecting sections provided respectively for the plurality of finger mechanisms and detecting strains generating in the links due to forces applied to the finger mechanisms; the operation controlling section controlling gripping force generated by the plurality of finger mechanisms, based on the operating positions of the actuators detected by the position detecting section and the strains of the links detected by the strain detecting sections.

BRIEF DESCRIPTION OF THE DRAWINGS

The above and other objects, features and advantages of the present invention will become more apparent from the following description of preferred embodiments in connection with the accompanying drawings, wherein:

FIG. 7B is an enlarged view of a part encircled in a broken line in FIG. 7A;

DETAILED DESCRIPTION

Figure 1:
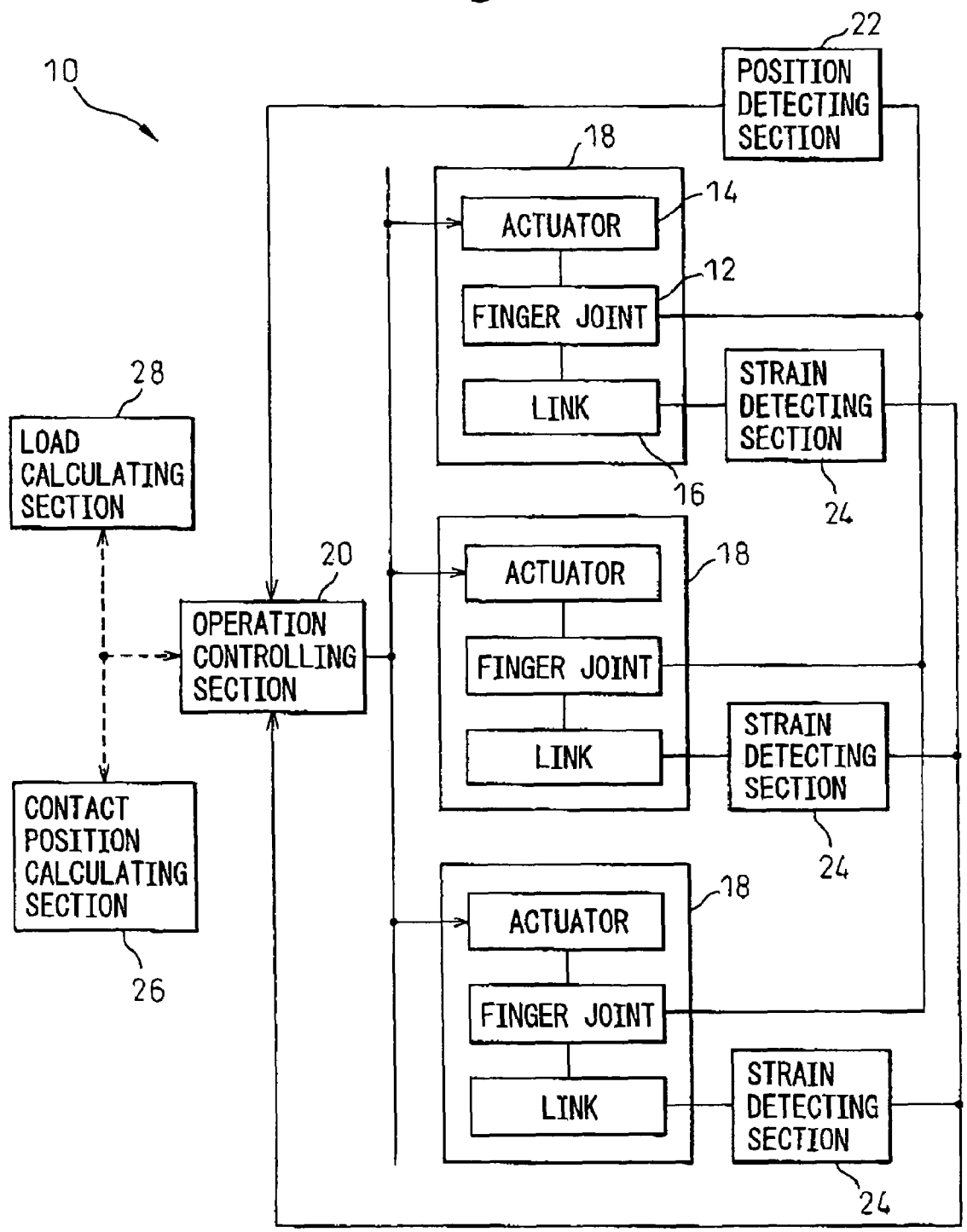
FIG. 1 is a functional block diagram showing the basic configuration of a gripping type hand according to the present invention.

The embodiments of the present invention are described below in detail, with reference to the accompanying drawings. In the drawings, the same or similar components are denoted by common reference numerals.

Referring to the drawings, FIG. 1 is a functional block diagram showing the basic configuration of a gripping type hand 10 according to the present invention. As shown in FIG. 1, the gripping type hand 10 according to present invention includes a plurality of finger mechanisms 18, each finger mechanism 18 is provided with a finger joint 12, an actuator 14 for driving the finger joint 12 and a link 16 supported by the finger joint 12 and operating under a driving force of the actuator 14. The gripping type hand 10 also includes an operation controlling section 20 able to respectively control the actuators 14 of the plurality of finger mechanisms 18 independently from each other; a position detecting section 22 for respectively detecting the operating positions of the finger joints 12 of the plurality of finger mechanisms 18; and strain detecting sections 24 provided respectively for the plurality of finger mechanisms 18 and detecting strains generating in the links 16 due to a force applied to the finger mechanisms 18. The operation controlling section 20 coordinately controls the actuators 14 of the plurality of finger mechanisms 18 to adjust a gripping force generated by the finger mechanisms 18, on the basis of the operating positions of the finger joints 12 of the respective finger mechanisms 18 detected by the position detecting section 22 and the strains of the links 16 of the respective finger mechanisms 18 detected by the strain detecting sections 24.

The above-described gripping type hand 10 is configured to be able to independently control the operations of the finger mechanisms 18 respectively having the finger joints 12, so that it is possible to grip or grasp objects having various dimensions and shapes by various operations of the finger mechanisms 18. Further, the hand is configured such that the strain detecting sections 24 provided respectively for the finger mechanisms 18 detect the strains generating in the links 16 of the respective finger mechanisms 18, and that the operation controlling section 20 adjusts the gripping force of the finger mechanisms 18 by using the detected strain data, so that it is possible to optimally control the gripping force while coordinately operating the finger mechanisms 18 so as to correspond to the loads applied from the gripped object to the individual finger mechanisms 18. In particular, according to the above configuration, it is possible to use, as a strain detecting section 24, a relatively inexpensive strain gauge which may be attached to the outer surface of the link 16 or incorporated inside the link 16, so that, in comparison with a configuration using a multi-axial force sensor unit, it is possible to reduce the cost of producing the gripping type hand 10. Further, in this arrangement, the strain gauge directly detects the strain in the link 16, and thus, unlike a configuration using a multi-axial force sensor unit which requires paying the very careful attention to a handling, a gripping force control is not liable to be affected by the performance deterioration or malfunction of the sensor. The method of controlling the gripping force, using the strain data of the link 16, will be explained later.

The gripping type hand 10 may further include a contact position calculating section 26 for determining a contact position on each of the finger mechanisms 18 at which each finger mechanism 18 contacts a gripped object, on the basis of the operating positions of the finger joints 12 detected by the position detecting section 22 and the strains of the links 16 detected by the strain detecting sections 24 (FIG. 1). According to this configuration, the operation controlling section 20 can monitor the contact positions on the respective finger mechanisms 18 with respect to the gripped object, and thus can immediately detect any slippage of the object with respect to the finger mechanisms 18 due to, e.g., an external force during a period when the hand grips the object. Therefore, for example, in a work for fitting the gripped object with another object by using a hand, if the gripped object is subjected to a positional deviation in the hand due to the slippage thereof with respect to the finger mechanisms 18, the operation controlling section 20 can suitably control the operations of the finger mechanisms 18 to compensate for the positional deviation and thus can perform a smooth fitting work.

Also, the gripping type hand 10 may further include a load calculating section 28 for determining a load applied on each of the finger mechanisms 18 from the gripped object, on the basis of the operating positions of the finger joints 12 detected by the position detecting section 22 and the strains of the links 16 detected by the strain detecting sections 24 (FIG. 1). In this arrangement, the load calculating section 28 uses the strain data detected by the strain detecting sections 24 in all of the finger mechanisms 18 to calculate the load applied on the hand 10 from the gripped object, in such a manner as to be divided into total six components of three-dimensional force and three-dimensional moment. Therefore, in this configuration, the operation controlling section 20 can execute a force control by using the six components of the load data determined by the load calculating section 28, which is equivalent to a force control by using a six-axial force sensor.

Figure 2:
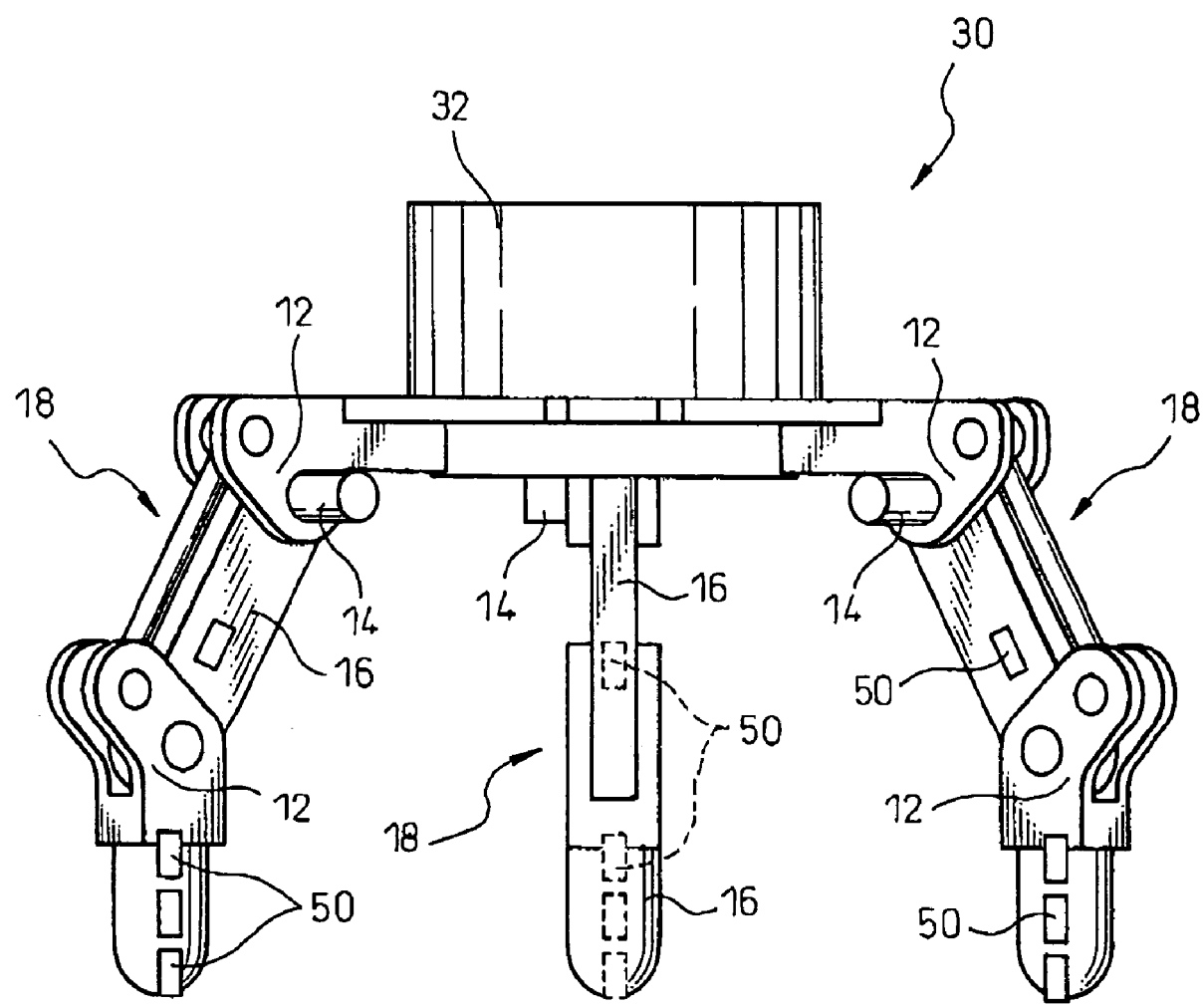
FIG. 2 is a front view of a gripping type hand according to an embodiment of the present invention.

FIG. 2 is a schematic front view of a gripping type hand 30 according to an embodiment of the present invention. The gripping type hand 30 has the basic configuration of the gripping type hand 10 shown in FIG. 1, and therefore, corresponding components are denoted by common reference numerals and explanations thereof are not repeated.

Figure 3A:
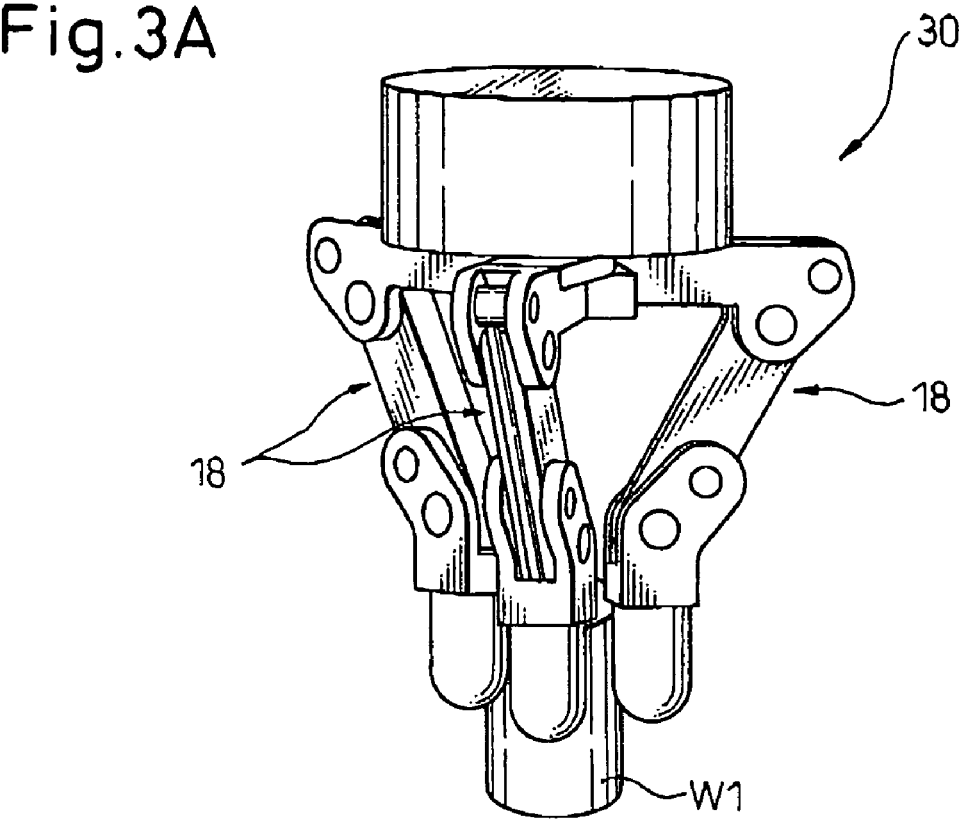
FIGS. 3A and 3B are views for explaining a gripping operation in the gripping type hand of FIG. 2, and showing the modes of gripping a small diameter object and a large diameter object, respectively.
Figure 3B:
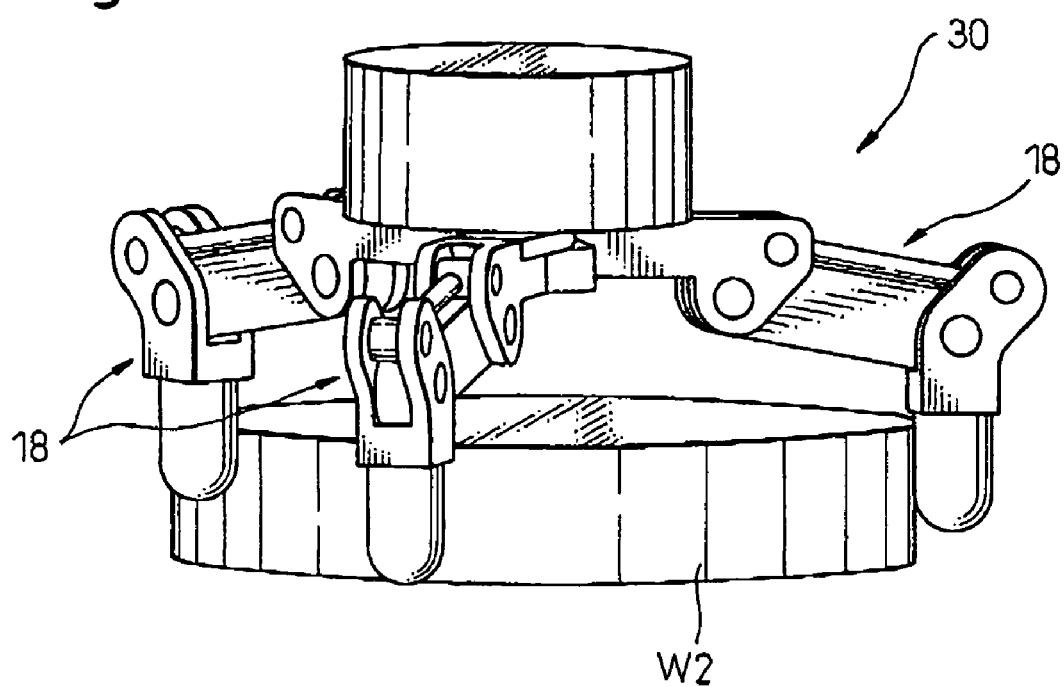

The gripping type hand 30 includes three finger mechanisms 18 attached to a common pedestal 32. The finger mechanisms 18 have their exclusive actuators 14, respectively, and thus can operate under the control of the operation controlling section 20 (FIG. 1) independently from each other. Three finger mechanisms 18 have the mutually identical configurations, and are attached to the pedestal 32 at predetermined regular intervals about the center axis of the hand 30 (i.e., at every 120 degrees of center angles). As shown in FIGS. 3A and 3B, the gripping type hand 30 can operate the three finger mechanisms 18 uniformly, so as to stably and accurately grasp a gripped object W1 having a relatively small diameter (FIG. 3A) or a gripped object W2 having a relatively large diameter (FIG. 3B) by the three finger mechanisms 18.

Figure 4:
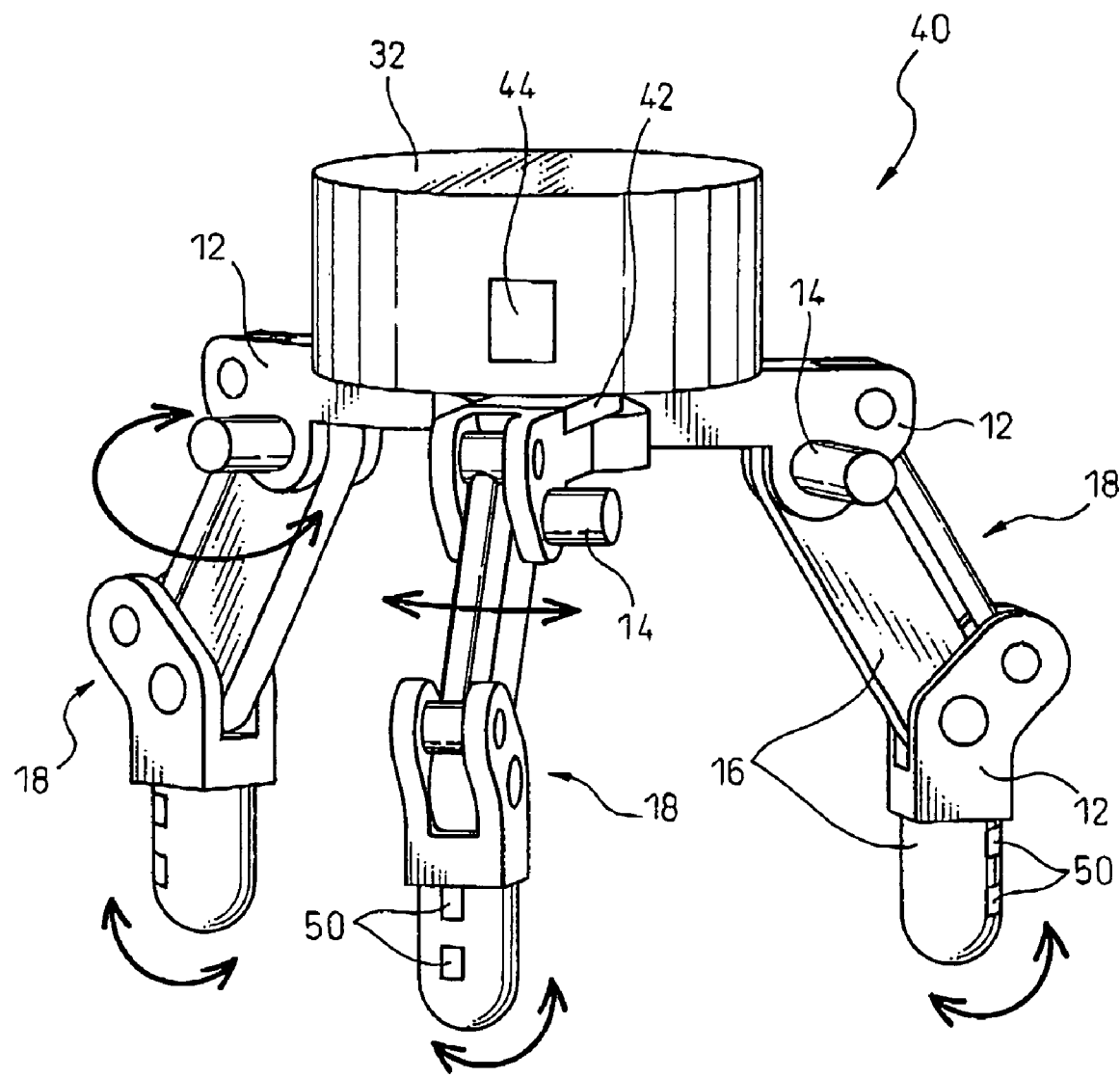
FIG. 4 is a perspective view of a gripping type hand according to another embodiment of the present invention.

FIG. 4 is a schematic front view of a gripping type hand 40 according to another embodiment of the present invention. The gripping type hand 40 has a configuration substantially the same as that of the gripping type hand 30 shown in FIG. 2, except for the provision of at least one of the finger mechanisms 18 as to be movably attached to the pedestal 32, and therefore, corresponding components are denoted by common reference numerals and explanations thereof are not repeated.

Figure 5A:
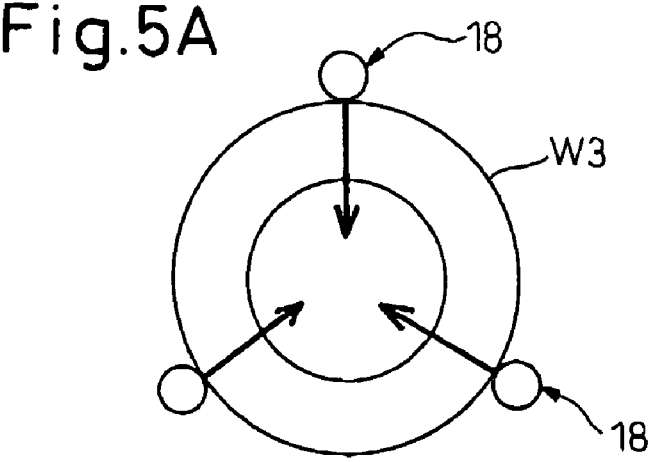
FIGS. 5A to 5D are views for explaining various gripping operations in the gripping type hand of FIG. 4.
Figure 5B:
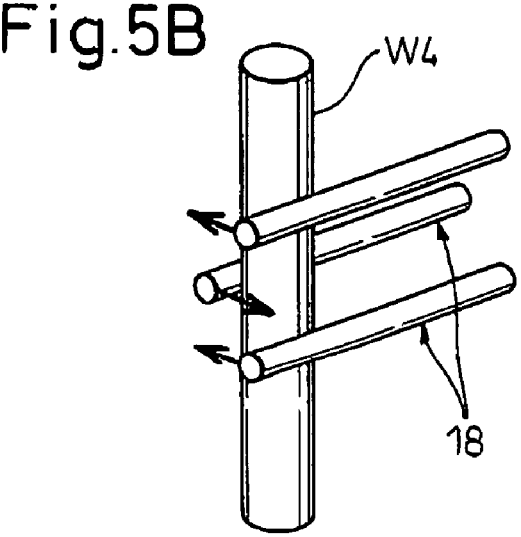
Figure 5C:
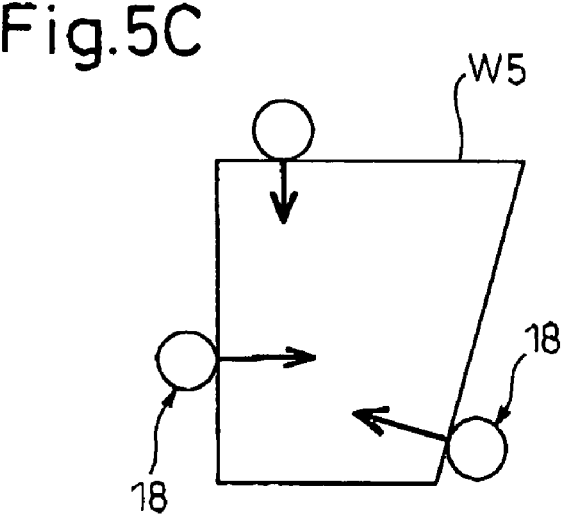
Figure 5D:
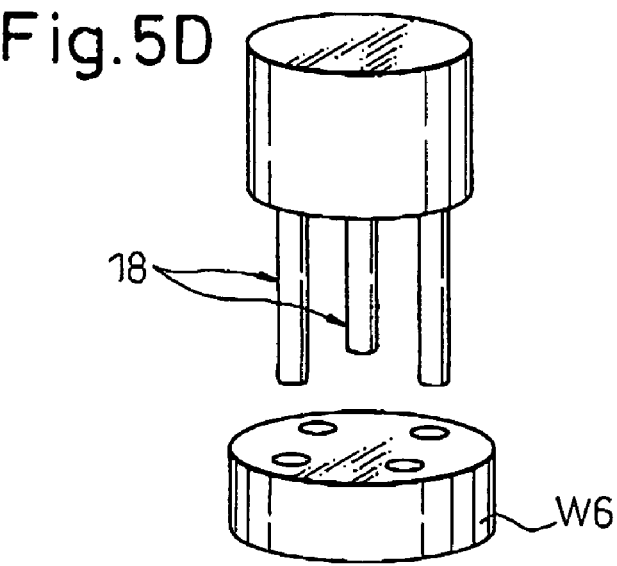
Figure 6A:
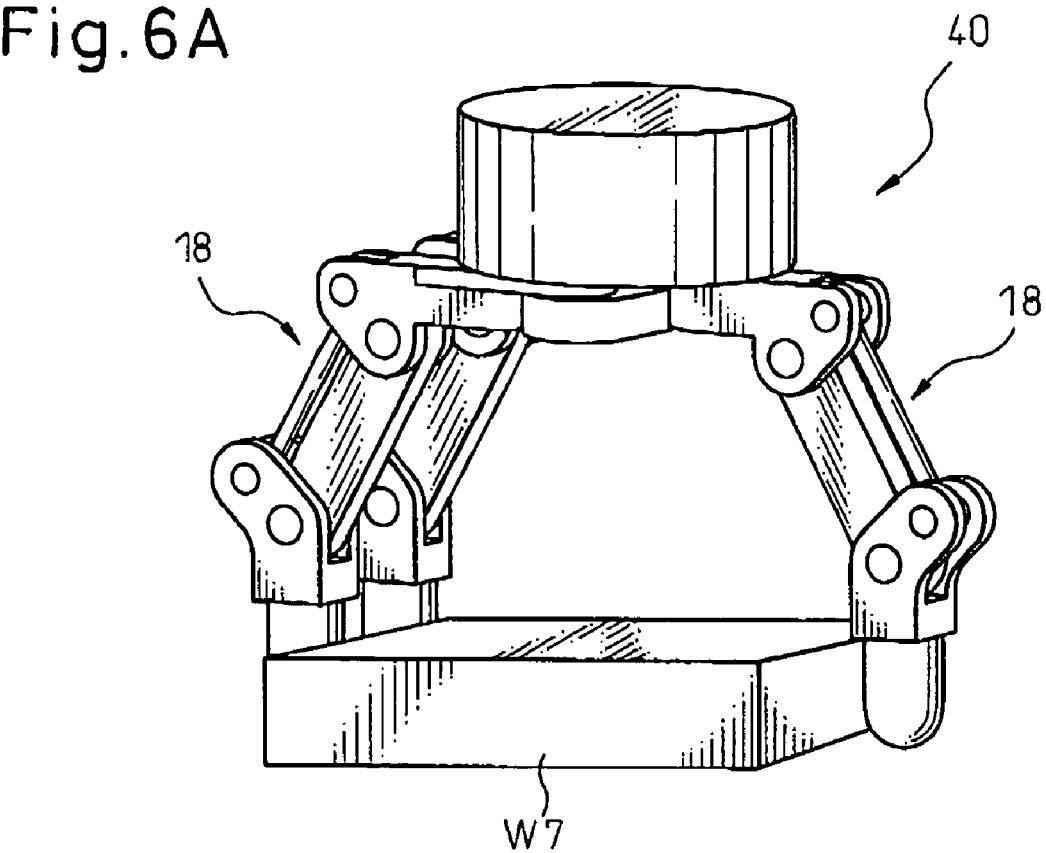
FIGS. 6A and 6B are views for explaining different gripping operations by the gripping type hand of FIG. 4 with respect to objects having different dimensions or shapes in a longitudinal direction, and respectively showing a case where the longitudinal dimension is within the finger operation stroke of the hand and a case where the longitudinal dimension is over the stroke of the hand.
Figure 6B:
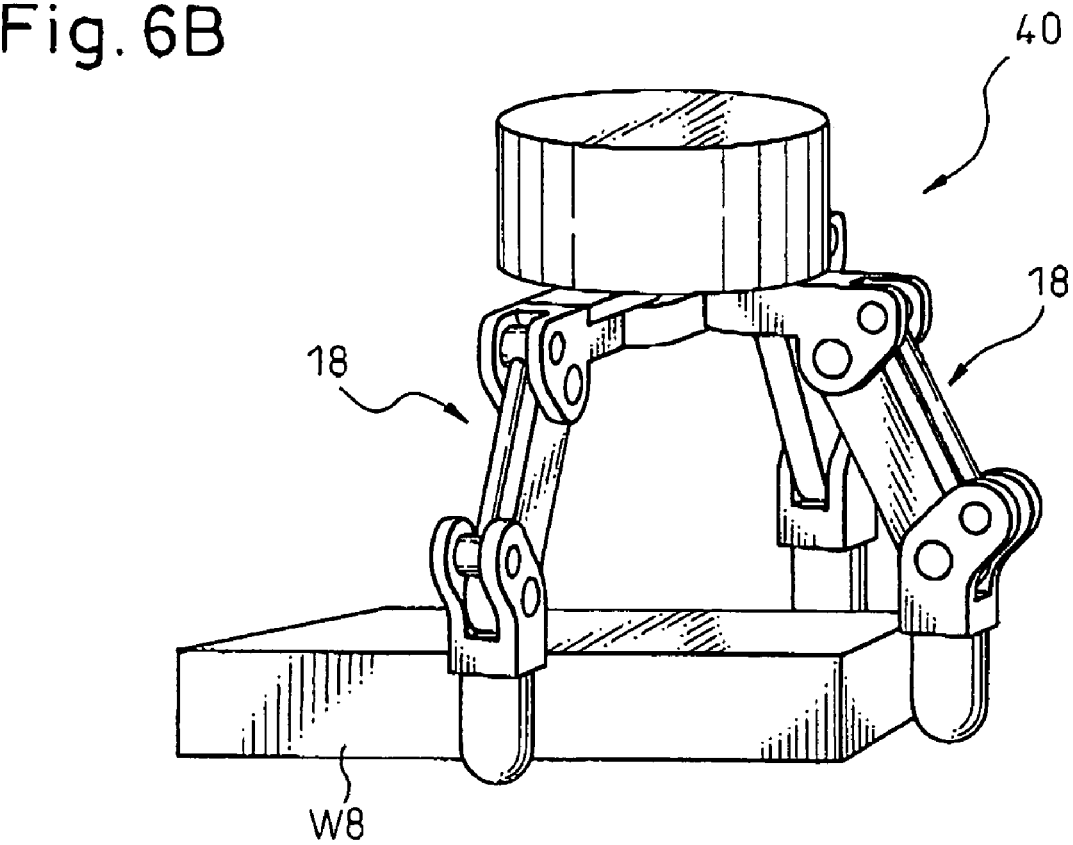

In the illustrated gripping type hand 40, two finger mechanisms 18 are movably attached to the pedestal 32. Further, the gripping type hand 40 is provided with a second actuator 44 for shifting attachment parts 42 of the movable finger mechanisms 18, attached to the pedestal 32, to respective suitable positions on the pedestal 32. Therefore, the three finger mechanisms 18 can be arranged at desired intervals (i.e., at desired center angles) with respect to the center axis of the hand 40. According to this configuration, the gripping type hand 40 can select an optimal gripping position in accordance with the shape of the object, so as to stably and accurately grasp, by using the three finger mechanisms 18, not only an object W3 having a circular contour as shown in FIG. 5A, but also an object W4 requiring a gripping force in two opposing directions as shown in FIG. 5B, or an object W5 having an irregular contour as shown in FIG. 5C. Further, as for an object W6 having a plurality of holes, the number of which does not correspond to the number of the finger mechanisms 18, as shown in FIG. 5D, it is possible to stably grasp the object W6 by selecting suitable holes and inserting the tips of the finger mechanisms 18 into the selected holes. Moreover, as shown in FIGS. 6A and 6B, a technique of gripping an object W7 having a rectangular contour by the desired finger mechanisms 18 arranged to oppositely face to each other (FIG. 6A), or a technique of gripping an object W8 having a longer rectangular contour by applying force from different three directions (FIG. 6B).

In the gripping type hand 30, 40 according to each of the above embodiments, the operation controlling section 20 (FIG. 1) can be configured from, e.g., a CPU (central processing unit) and a memory in a not-shown hand control unit or robot control unit. Further, the position detecting section 22 (FIG. 1) can be configured from angle detection sensors (not shown) provided for the respective actuators 14. In this case, the position detecting section 22 detects the angles of the finger joints 12 driven by the actuators 14, and thus the operation controlling section 20 recognizes the opening extent of the finger mechanisms 18 and/or the positions of the respective finger mechanisms 18. In a case where a servomotor is used as the actuator 14, an optical or magnetic type pulse encoder is used as the angle detection sensor.

Figure 7A:
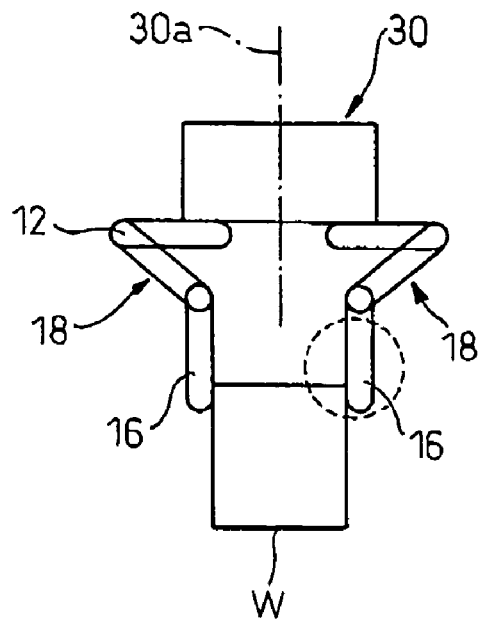
FIGS. 7A and 7B are views for explaining a gripping force controlling method in a gripping type hand according to the present invention, and showing a procedure for detecting the slippage of an object, where
Figure 7B:
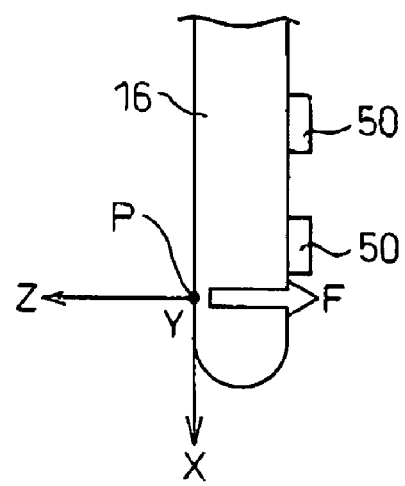

Further, as shown in FIGS. 2 and 4, each strain detecting section 24 (FIG. 1) can be configured from a plurality of single-axis strain gauges 50 provided for the desired link 16 of each finger mechanism 18. The strain gauge 50 may be composed of a semiconductor structure having a relatively high sensitivity. These strain gauges 50 may be attached to desired positions on the outer surface of the link 16 or may be placed at desired positions inside the link 16. The provision of several single-axis strain gauges 50 in a single finger mechanism 18 enables a contact position on the finger mechanism 18 to be determined, at which the finger mechanism 18 contact the gripped object. A calculating method executed by the contact position calculating section 26 (FIG. 1) will be explained below, with reference to FIGS. 7A and 7B.

For example, in a case where each finger mechanism 18 of the gripping type hand 30 brings one point P on a distal-end link 16 into contact with a gripped object W so as to grip the object W (FIG. 7A), the position of the contact point P can be determined in a following way. In this connection, in a gripping operation control for the hand 30, an inherent coordinate system (or a finger coordinate system) is set for each finger mechanism 18 as shown in, e.g., FIG. 7B. First, the link 16 of each finger mechanism 18 contacts the gripped object W at one point P at the innermost side as seen from a hand center axis 30a, so that a Y-coordinate and a Z-coordinate of the point P are determined from the current position and configuration (or orientation) of the finger mechanism 18 as well as the dimension of the link 16. In other words, the only unknown parameter is a coordinate on an X-axis corresponding to a vertical direction in FIGS. 7A and 7B, and is determined by a calculation on the basis of the positions on the link 16 of the strain gauges 50 provided to be dispersed in the same vertical direction on the link 16 as well as of the strain data output from the strain gauges 50.

It is assumed that positional components in an X-axis direction of the strain gauges 50 are "x1" and "x2", and that the values of strains detected respectively by the strain gauges 50 are "ε1" and "ε2". The values of "x1" and "x2" are previously stored in, e.g., the memory of the operation controlling section 20. The values of "ε1" and "ε2" are proportional to bending moments generating due to a force "F" applied from the gripped object W to the link 15 at the contact point P, and therefore, the following equations are obtained.

$$\epsilon 1 = C1 \cdot F \cdot (x - x1)$$

$$\epsilon 2 = C2 \cdot F \cdot (x - x2)$$

Here, "C1" and "C2" are known coefficients depending on the material and/or shape of the link 16.

If these two equations are simultaneously solved, it is possible to determine the force "F" and the X-coordinate "x" of the contact point P.

Figure 8:
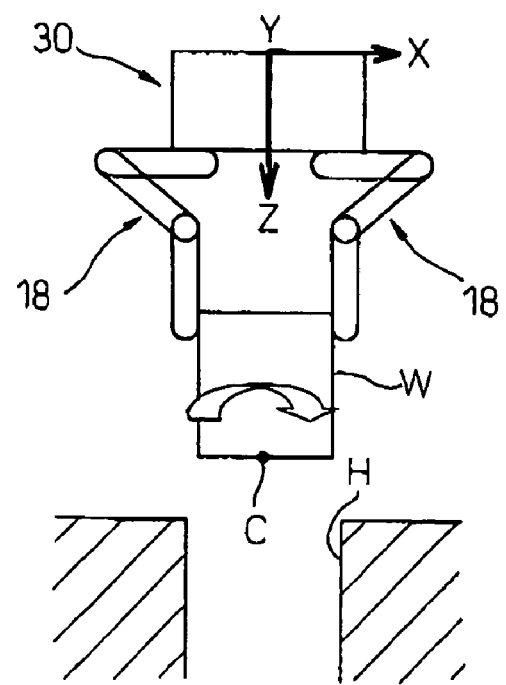
FIG. 8 is a view for explaining a gripping force controlling method in a gripping type hand according to the present invention, and showing a fitting work using the hand.

The position of the contact point P on the finger mechanism 18 in relation to the gripped object W, determined by the contact position calculating section 26, is effectively used under following circumstances. For example, when a robot performs a work for fitting objects with each other, a control point C for changing the position and/or orientation of an object W (i.e., an aimed point for an operation control of the finger mechanisms 18) is set at a center on the front end face of the gripped object W as seen in a fitting direction, in an illustrated coordinate system (or an end-effector coordinate system) previously determined on the hand 30 as shown in FIG. 8, and the object W is finely rotated about the X-axis and Y-axis with the control point C being centered and is moved in a Z-axis direction, so that the object W can be smoothly inserted into a bore H of the counterpart object. However, during a period when the hand 30 grips the object W, if a slippage is generated between the links 16 and the object W, due to an external force applied to the object W, etc., to cause a deviation of the gripping position, the control point C is actually deviated from the center position of the front end face of the object W, so that it may become difficult to perform the fitting work in an aimed way.

Thus, the contact position calculating section 26 (FIG. 1) monitors (or stores) the outputs of the strain sensors 50 provided for all finger mechanisms 18, and determines a time-base varying amount $\Delta x$ of the contact position P on each finger mechanism 18, during a period when the hand 30 grips the object W. Further, the operation controlling section 20 coordinately controls all finger mechanisms 18 to adjust the gripping force (in this example, the gripping force is increased to prevent a further deviation), on the basis of the varying amount $\Delta x$ of the contact position P (i.e., by a judgment such that the object W is slipped when $\Delta x$ is not zero).

Figure 9A:
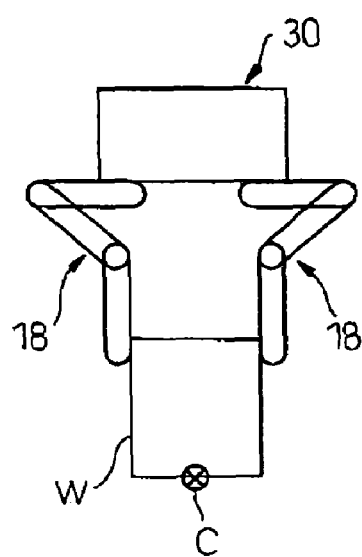
FIGS. 9A to 9C are views for explaining a gripping force controlling method in a gripping type hand according to the present invention, and showing a procedure for correcting the slippage of an object.
Figure 9B:
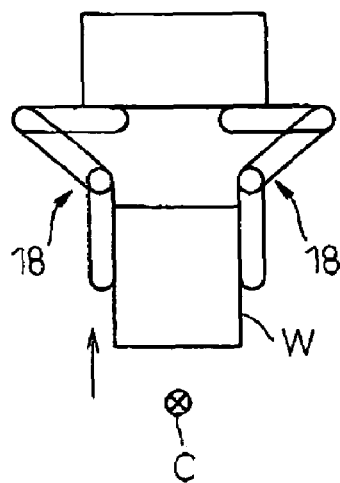
Figure 9C:
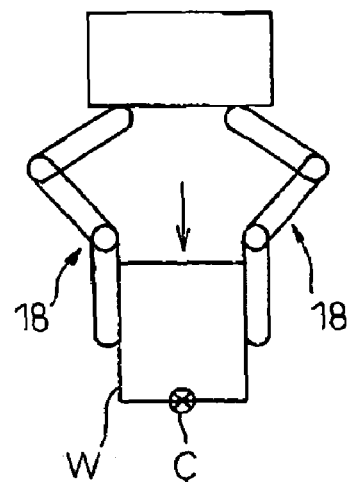

Even when the deviation of a gripping position (i.e., a contact position P) is detected and the gripping force is adjusted in the above manner, once the gripping position is deviated, the fitting work may also not be performed in an aimed way. This problem can be solved by the operation controlling section 20 (FIG. 1), as shown in, e.g., FIGS. 9A to 9C, which adjusts a geometric configuration (or orientation) of each finger mechanism 18, on the basis of the varying amount $\Delta x$ of the contact position P determined by the contact position calculating section 26 (FIG. 1). More specifically, starting from an initial gripping state (FIG. 9A), when a gripped object W is subjected to a positional deviation relative to each finger mechanism 18 (FIG. 9B), the operation controlling section 26 adjusts the geometric configuration (or orientation) of each finger mechanism 18, so as to spatially shift the gripped object W by a distance corresponding to the varying amount $\Delta x$ of the contact position P (FIG. 9C). Consequently, the control point C in the end-effector coordinate system returns to an initially set position on the surface of the gripped object W.

Figure 10A:
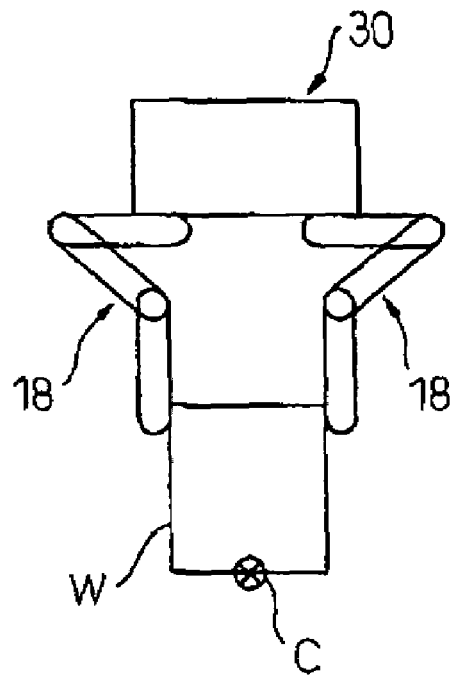
FIGS. 10A to 10D are views for explaining a gripping force controlling method in a gripping type hand according to the present invention, and showing another procedure for correcting the slippage of an object.
Figure 10B:
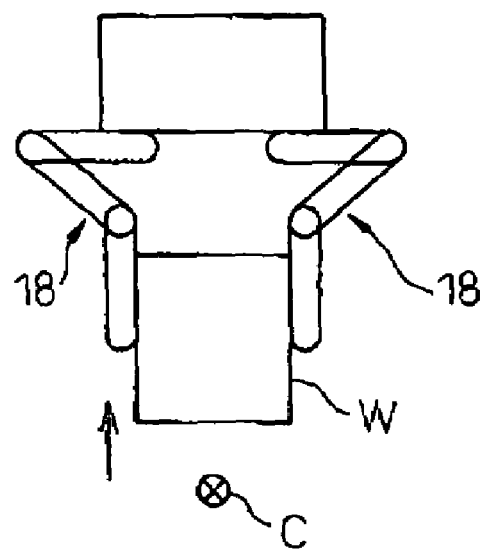
Figure 10C:
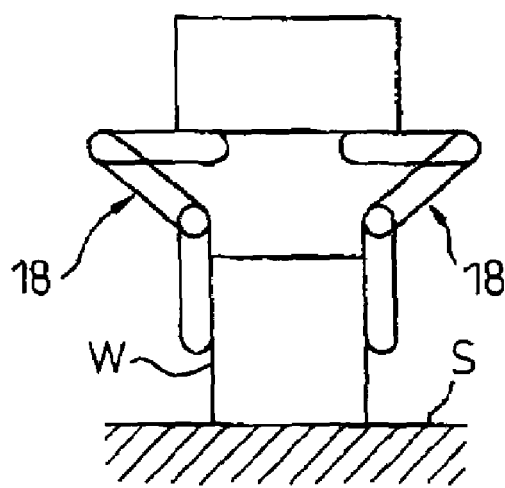
Figure 10D:
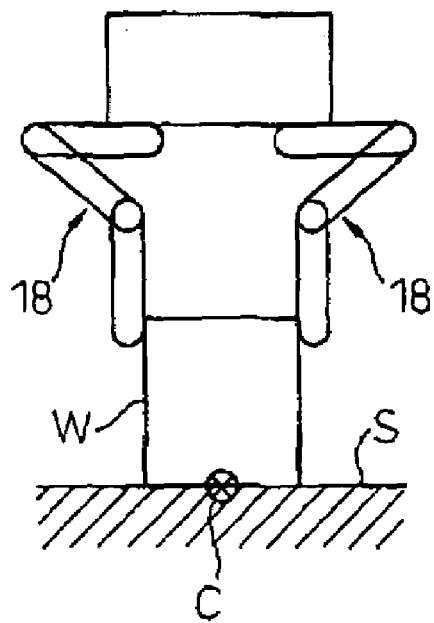

As a measure for eliminating the deviation of a gripping position (or a contact position P), it is also effective, as shown in FIGS. 10A to 10D, that the hand 30 operates to regrasp an object W. In this arrangement, the operation controlling section 20 (FIG. 1) controls the operation of each finger mechanism 18 to adjust a relative positional relationship between each finger mechanism 18 and a gripped object W, on the basis of the varying amount $\Delta x$ of the contact position P determined by the contact position calculating section 26 (FIG. 1). More specifically, starting from an initial gripping state (FIG. 10A), when the gripped object W is subjected to a positional deviation relative to each finger mechanism 18 (FIG. 10B), the operation of the hand 30 is controlled to temporarily place the gripped object W on a suitable stationary surface S (FIG. 1C), and during this state, the operation controlling section 26 suitably operates each finger mechanism 18 to move the finger mechanism 18 relative to the gripped object W by a distance corresponding to the varying amount $\Delta x$ of the contact position P (or alternatively, the hand 30 is moved relative to the gripped object W by the operation control of the hand 30) (FIG. 10D). Consequently, the control point C in the end-effector coordinate system returns to an initially set position on the surface of the gripped object W.

Figure 11A:
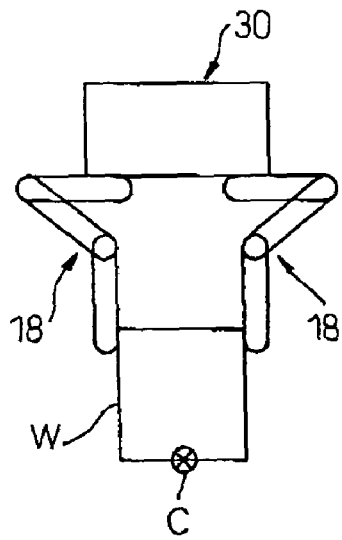
FIGS. 11A to 11C are views for explaining a gripping force controlling method in a gripping type hand according to the present invention, and showing still another procedure for correcting the slippage of an object.
Figure 11B:
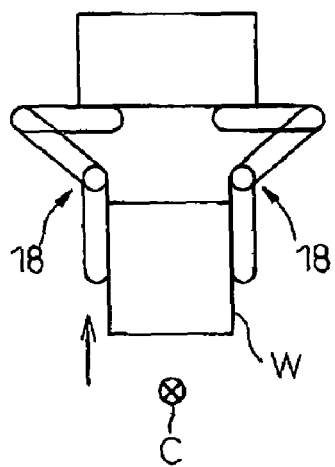
Figure 11C:
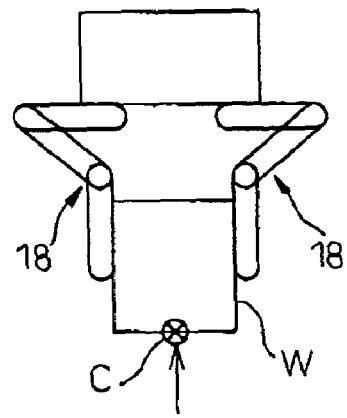

As a yet other measure for eliminating the deviation of a gripping position (or a contact position P), it is also effective, as shown in FIG. 11A to FIG. 1C, to change the position of a control point C. In this arrangement, the operation controlling section 20 (FIG. 1) adjusts the position of a predetermined control point C for the operation control of each finger mechanism 18, on the basis of the varying amount $\Delta x$ of the contact position P determined by the contact position calculating section 26 (FIG. 1). More specifically, starting from an initial gripping state (FIG. 11A), when the gripped object W is subjected to a positional deviation relative to each finger mechanism 18 (FIG. 11B), the operation controlling section 26 does not operate the finger mechanism 18, but moves the control point C in the end-effector coordinate system by a distance corresponding to the varying amount $\Delta x$ of the contact position P (FIG. 11C). Consequently, the control point C in the end-effector coordinate system returns to an initially set position on the surface of the gripped object W.

In the configuration of the above embodiment in which the several single-axis strain gauges 50 are provided for the desired link 16 of each finger mechanism 18, the load calculating section 28 (FIG. 1) can calculate a load applied to the hand 30, 40 from the gripped object, in such a manner as to be divided into total six components of three-dimensional force and three-dimensional moment, as follows. First, the operating position of each actuator 14 driving each finger mechanism 18 is detected by the built-in angle detection sensor, i.e., the position detecting section 22 (FIG. 1), and the load calculating section 28 determines the geometric configuration (or orientation) of the finger mechanism 18 by calculation, on the basis of the operating position (or angle) data as detected. Next, the load calculating section 28 calculates the respective positions of the strain gauges 50 in the coordinate system (or the end-effector coordinate system) preset on the hand 30, on the basis of the geometric configuration (or orientation) of each finger mechanism 18 and the previously stored positions of the strain gauges 50 on the finger mechanism 18. Further, the load calculating section 28 calculates the six components (force and moment) of the load, on the basis of the strain data detected by the respective strain gauges 50.

Therefore, in this configuration, the operation controlling section 20 can execute a force control by using the six components of the load data determined by the load calculating section 28, which is equivalent to a force control by using a six-axial force sensor. According to this configuration, the hand 30, 40 can be effectively used in an application requiring a compliance control of a robot, such as a precision fitting work. In this connection, the equation for calculating the six components (force and moment) of a load from the data of the spatially distributed strain gauges 50 is known, so that the explanation thereof is omitted.

In the gripping type hand 30, 40 according to each of the above-mentioned embodiments, each of the finger mechanisms 18 is provided with a plurality of (two, in the drawing) finger joints 12 and a plurality of (two, in the drawing) links 16, one link 16 being comprised of a parallel link mechanism (also called as a parallel crank mechanism), as shown in FIGS. 2 and 4. Such a configuration has the advantage of reducing the number of the actuators 14 and simplifying the structure and control thereof, in a case where the finger mechanisms 18 are allowed or required to maintain a geometric configuration (or orientation) such that the links 16 at distal ends thereof extend downward in a vertical direction during the gripping work of the hand 30, 40. More specifically, when the explanation is given in association with FIG. 4, each finger mechanism 18 of the hand 40 is provided with the actuator 14 in a proximal-end joint 12 adjoining to the attachment part 42 attached to the pedestal 32 (FIG. 4), and the link 16 supported by the proximal-end joint 12 is comprised of the parallel link mechanism. The actuator 14 is not provided in a distal-end joint 12 at the other end of the parallel link mechanism.

Figure 12:
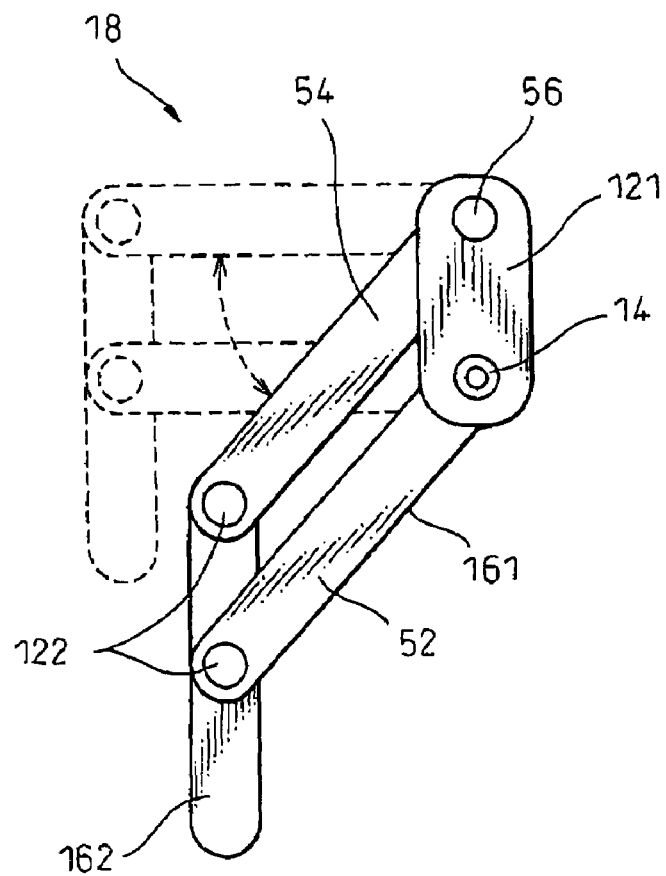
FIG. 12 is a view typically showing a finger mechanism of the gripping type hand of FIGS. 2 and 4.

When explaining in more detail with reference to FIG. 12 typically showing the finger mechanism 18, the actuator 14 provided in the proximal-end joint 121 drives the joint 121 so as to pivot one link element 52 of the link 161 having the parallel link mechanism about the joint 121. Then, accompanying with the pivoting motion of the link element 52, the other link element 54 of the parallel link mechanism pivots about the bearing 56 on the joint 121, and the terminal end link 162 connected to both the link elements 52 and 54 through the distal-end joint 122 moves in a parallel translation. As a result, the opening/closing motion of each finger mechanism 18 of the hand 30, 40 is performed in a state where the distal-end link 162 is maintained in a vertical downward extension.

The above-described parallel link mechanism may also be applied to a plurality of links 16 constituting one finger mechanism 18, depending on the number of links 16 of the finger mechanism 18. The gripping type hand according to the present invention having the features of the above configuration may also be explained as follows:

A gripping type hand, including a plurality of finger mechanisms, each finger mechanism being provided with a plurality of finger joints, a plurality of links supported by the finger joints, at least one of the links including a parallel link mechanism, and an actuator for causing an operation of the parallel link mechanism and thereby causing an operation of another link following the parallel link mechanisms; an operation controlling section capable of respectively controlling actuators of the plurality of finger mechanisms independently from each other; a position detecting section for respectively detecting operating positions of the actuators of the plurality of finger mechanisms; and strain detecting sections provided respectively for the plurality of finger mechanisms and detecting strains generating in the links due to forces applied to the finger mechanisms; the operation controlling section controlling gripping force generated by the plurality of finger mechanisms, based on the operating positions of the actuators detected by the position detecting section and the strains of the links detected by the strain detecting sections.

It should be appreciated that the present invention is not limited to the above preferred embodiments. For example, in the gripping type hand 40 in which the attachment part 42 of at least one finger mechanism 18 is movable on the pedestal 32 (FIG. 4), the operation controlling section 20 (FIG. 1) may be configured such as to control the second actuator 44 on the basis of the operating positions of the finger joints 12 detected by the position detecting section 22 (FIG. 1) and the strains of the links 16 detected by the strain detecting sections 24 (FIG. 1), so as to adjust the gripping force by the plurality of finger mechanisms 18. According to this configuration, it is also possible to adjust the gripping force in a direction perpendicular to the opening/closing direction of the finger mechanisms 18.

While the invention has been described with reference to specific preferred embodiments, it will be understood by those skilled in the art that various changes and modifications may be made thereto without departing from the scope of the following claims.

The invention claimed is:

1. A gripping type hand, comprising:
   a plurality of finger mechanisms provided respectively with finger joints, actuators for driving said finger joints, and links supported by said finger joints and operating under driving force of said actuators;
   an operation controlling section capable of respectively controlling said actuators of said plurality of finger mechanisms independently from each other;
   a position detecting section for respectively detecting operating positions of said finger joints of said plurality of finger mechanisms; and
   strain detecting sections provided respectively for said plurality of finger mechanisms and detecting strains generating in said links due to force applied to said finger mechanisms;
   said operation controlling section coordinately controlling said actuators of said plurality of finger mechanisms to adjust gripping force generated by said plurality of finger mechanisms, based on said operating positions of said finger joints detected by said position detecting section and said strains of said links detected by said strain detecting sections;
   a contact position calculating section for determining a contact position on each of said plurality of finger mechanisms at which each finger mechanism contacts a gripped object, based on said operating positions of said finger joints detected by said position detecting section and said strains of said links detected by said strain detecting sections;
   wherein said contact position calculating section determines a time-base varying amount of said contact position on said each finger mechanism during a period when said hand grips said gripped object; and wherein said operation controlling section adjusts said gripping force, based on said varying amount of said contact position.

2. A gripping type hand as set forth in claim 1, further comprising a load calculating section for determining a load applied on said hand from a gripped object, based on said operating positions of said finger joints detected by said position detecting section and said strains of said links detected by said strain detecting sections.

3. A gripping type hand as set forth in claim 1, wherein each of said plurality of finger mechanisms is provided with a plurality of finger joints and a plurality of links, at least one of said plurality of links comprises a parallel link mechanism; and wherein each of said actuators drives one finger joint supporting said parallel link mechanism, to cause an operation of said parallel link mechanism and simultaneously cause an operation of another link following said parallel link mechanism.

4. A gripping type hand as set forth in claim 1, further comprising a pedestal to which said plurality of finger mechanisms are attached, and a second actuator for shifting on said pedestal an attachment part of at least one finger mechanism attached to said pedestal.

5. A gripping type hand as set forth in claim 4, wherein said operation controlling section controls said second actuator to adjust said gripping force generated by said plurality of finger mechanisms, based on said operating positions of said finger joints detected by said position detecting section and said strains of said links detected by said strain detecting sections.

6. A gripping type hand as set forth in claim 1, wherein each of said strain detecting sections comprises a strain gauge provided for each of said plurality of finger mechanisms.

7. A gripping type hand as set forth in claim 1, wherein each of said strain detecting sections comprises a plurality of single-axis strain gauges provided for each of said links of said finger mechanisms.

8. A gripping type hand, comprising:
   a plurality of finger mechanisms provided respectively with finger joints, actuators for driving said finger joints, and links supported by said finger joints and operating under driving force of said actuators;
   an operation controlling section capable of respectively controlling said actuators of said plurality of finger mechanisms independently from each other;
   a position detecting section for respectively detecting operating positions of said finger joints of said plurality of finger mechanisms; and
   strain detecting sections provided respectively for said plurality of finger mechanisms and detecting strains generating in said links due to force applied to said finger mechanisms;
   said operation controlling section coordinately controlling said actuators of said plurality of finger mechanisms to adjust gripping force generated by said plurality of finger mechanisms, based on said operating positions of said finger joints detected by said position detecting section and said strains of said links detected by said strain detecting sections;
   a contact position calculating section for determining a contact position on each of said plurality of finger mechanisms at which each finger mechanism contacts a gripped object, based on said operating positions of said finger joints detected by said position detecting section and said strains of said links detected by said strain detecting sections;
   wherein said contact position calculating section determines a time-base varying amount of said contact position on said each finger mechanism during a period when said hand grips said gripped object; and wherein said operation controlling section adjusts a geometric configuration of said each finger mechanism, based on said varying amount of said contact position.

9. A gripping type hand, comprising:
   a plurality of finger mechanisms provided respectively with finger joints, actuators for driving said finger joints, and links supported by said finger joints and operating under driving force of said actuators;
   an operation controlling section capable of respectively controlling said actuators of said plurality of finger mechanisms independently from each other;
   a position detecting section for respectively detecting operating positions of said finger joints of said plurality of finger mechanisms; and
   strain detecting sections provided respectively for said plurality of finger mechanisms and detecting strains generating in said links due to force applied to said finger mechanisms;
   said operation controlling section coordinately controlling said actuators of said plurality of finger mechanisms to adjust gripping force generated by said plurality of finger mechanisms, based on said operating positions of said finger joints detected by said position detecting section and said strains of said links detected by said strain detecting sections;

a contact position calculating section for determining a contact position on each of said plurality of finger mechanisms at which each finger mechanism contacts a gripped object, based on said operating positions of said finger joints detected by said position detecting section and said strains of said links detected by said strain detecting sections;

wherein said contact position calculating section determines a time-base varying amount of said contact position on said each finger mechanism during a period when said hand grips said gripped object; and wherein said operation controlling section adjusts a relative positional relationship between said each finger mechanism and said gripped object, based on said varying amount of said contact position.

10. A gripping type hand, comprising:

a plurality of finger mechanisms provided respectively with finger joints, actuators for driving said finger joints, and links supported by said finger joints and operating under driving force of said actuators;

an operation controlling section capable of respectively controlling said actuators of said plurality of finger mechanisms independently from each other;

a position detecting section for respectively detecting operating positions of said finger joints of said plurality of finger mechanisms; and strain detecting sections provided respectively for said plurality of finger mechanisms and detecting strains generating in said links due to force applied to said finger mechanisms;

said operation controlling section coordinately controlling said actuators of said plurality of finger mechanisms to adjust gripping force generated by said plurality of finger mechanisms, based on said operating positions of said finger joints detected by said position detecting section and said strains of said links detected by said strain detecting sections;

a contact position calculating section for determining a contact position on each of said plurality of finger mechanisms at which each finger mechanism contacts a gripped object, based on said operating positions of said finger joints detected by said position detecting section and said strains of said links detected by said strain detecting sections;

wherein said contact position calculating section determines a time-base varying amount of said contact position on said each finger mechanism during a period when said hand grips said gripped object; and wherein said operation controlling section adjusts a position of a control point provided on said gripped object as an aimed point for an operation control of said plurality of finger mechanisms, based on said varying amount of said contact position.

* * * * *